(12) United States Patent
Crockett et al.

(10) Patent No.: US 7,677,440 B2
(45) Date of Patent: Mar. 16, 2010

(54) POINT OF SALE TERMINAL NETWORK IMPLEMENTATION FOR TRANSMITTING DATA INDICATIVE OF TERMINAL CHANGES UPON SWITCHING OF OPEN CLOSE STATE OF CASH DRAWER

(75) Inventors: Timothy Wayne Crockett, Raleigh, NC (US); David John Steiner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 11/841,203

(22) Filed: Aug. 20, 2007

(65) Prior Publication Data

US 2009/0050684 A1 Feb. 26, 2009

(51) Int. Cl.
*G06F 17/00* (2006.01)
*G06K 15/00* (2006.01)
*G06Q 20/00* (2006.01)

(52) U.S. Cl. .................. 235/375; 235/383; 705/16; 705/17

(58) Field of Classification Search .............. 235/375; 705/16–25
See application file for complete search history.

(56) References Cited

U.S. PATENT DOCUMENTS

| 4,752,874 A | * | 6/1988 | Meyers | 705/18 |
| 2002/0030101 A1 | * | 3/2002 | Inoue et al. | 235/381 |
| 2005/0017066 A1 | * | 1/2005 | Carter | 235/375 |
| 2005/0071283 A1 | * | 3/2005 | Randle et al. | 705/75 |

* cited by examiner

*Primary Examiner*—Michael G Lee
*Assistant Examiner*—Laura Gudorf
(74) *Attorney, Agent, or Firm*—Julius B. Kraft; Jason O. Piche

(57) ABSTRACT

Tracking at the local point of sale terminal level, changes in data associated with each terminal, such as a changed printer or POS register supporting a particular POS terminal, the identified cash drawer for the terminal, the particular changeable removable cash till in the cash drawer or the particular terminal operator. The POS terminal comprises a cash drawer including a drawer identifier, a cash till, including a till identifier, removably engagable with the drawer, as well as apparatus for reading the drawer identifier, apparatus for reading the till identifier when said till is engaged with the drawer and apparatus for transmitting the read drawer and till identifiers to the system administrator.

14 Claims, 3 Drawing Sheets

POINT OF SALE TERMINAL NETWORK IMPLEMENTATION FOR TRANSMITTING DATA INDICATIVE OF TERMINAL CHANGES UPON SWITCHING OF OPEN CLOSE STATE OF CASH DRAWER

TECHNICAL FIELD

The present invention relates to networks of point of sale terminals, and more particularly to the collecting of information at each terminal that is pertinent to the particular terminal.

BACKGROUND OF RELATED ART

Point of sale (POS) terminal systems are used in restaurants, hotels, stadiums, casinos, as well as in retail establishments. The conventional application of the POS system and network is at the check-out counter on an aisle where people place items that are to be purchased from a supermarket or department store. The cashier or terminal operator rings up each item on the terminal and obtains a total. The charges for items are read by appropriate readers from the barcodes on the items. From original cash register terminals, these POS terminals have evolved to permit multiple applications (giftcard, credit card, driver's license verification, age verification, check verification, etc.). Despite these advances, most current POS terminals continue to operate with a two state cash drawer: open/close, with the opening of the cash drawer breaking a switch to thereby transmit all accumulated data for the transaction to the POS system administrator where all transaction and ancillary data are stored in a POS system database.

System administration for POS terminals is set up at many levels in the networked system. For a retail store, the system administration may be on a first level at a POS system controller that correlates all of the data accessed from a row of checkout terminals and has the correlated data stored in associated databases. The POS store controller may be at a node in a hierarchy of store system controllers that are correlated by an appropriate hierarchical next level business administrator or correlator. The business levels in the POS business hierarchy may, of course, include regional, national and even global levels.

SUMMARY OF THE PRESENT INVENTION

With such extensive tracking and correlating done at all levels of the hierarchy of POS system administration, it would be desirable to track and control some data related to POS terminals locally at the terminal level, and be able to readily make such data efficiently available to the POS administrator or controller for a row of such local POS terminals.

The present invention provides a system for tracking at the local POS terminal level, changes in data associated with each terminal, such as a changed printer or POS register supporting a particular POS terminal; the identified cash drawer for the terminal; the particular changeable removable cash till in the cash drawer or the particular terminal operator who signed out for the cash till and is, thus, responsible for the cash till and associated cash drawer transactions.

The invention involves a POS network system including a plurality of POS terminals connected to a system administrator, wherein each of the terminals comprises a cash drawer including a drawer identifier, a cash till, including a till identifier. The till is removably engagable with the drawer. The terminal also includes apparatus for reading the drawer identifier, apparatus for reading the till identifier when said till is engaged with the drawer and apparatus for transmitting the read drawer and till identifiers to the system administrator.

The POS terminal may further include a device for sensing the disengagement of the till; and apparatus for signaling the system administrator that the till is disengaged from the drawer. The system be may set up so that each of the cash drawers has a fixed association with a corresponding terminal and each of said tills may be switched from cash drawer to cash drawer.

In accordance with another aspect of the present invention, there is provided a POS network system including a plurality of POS terminals connected to a system administrator, wherein each of the terminals comprises a cash drawer including a drawer identifier and a microprocessor incorporated into the cash drawer. Data indicative of changes related to each terminal is stored in association with the microprocessor. There is a device in each drawer that is responsive to a switch in the open/close status of the drawer and transmits the switch in status of the drawer to the system administrator via a status line. Also, there is an implementation in the microprocessor, responsive to the switch in status for transmitting the data indicative of changes to the system administrator via the status line.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
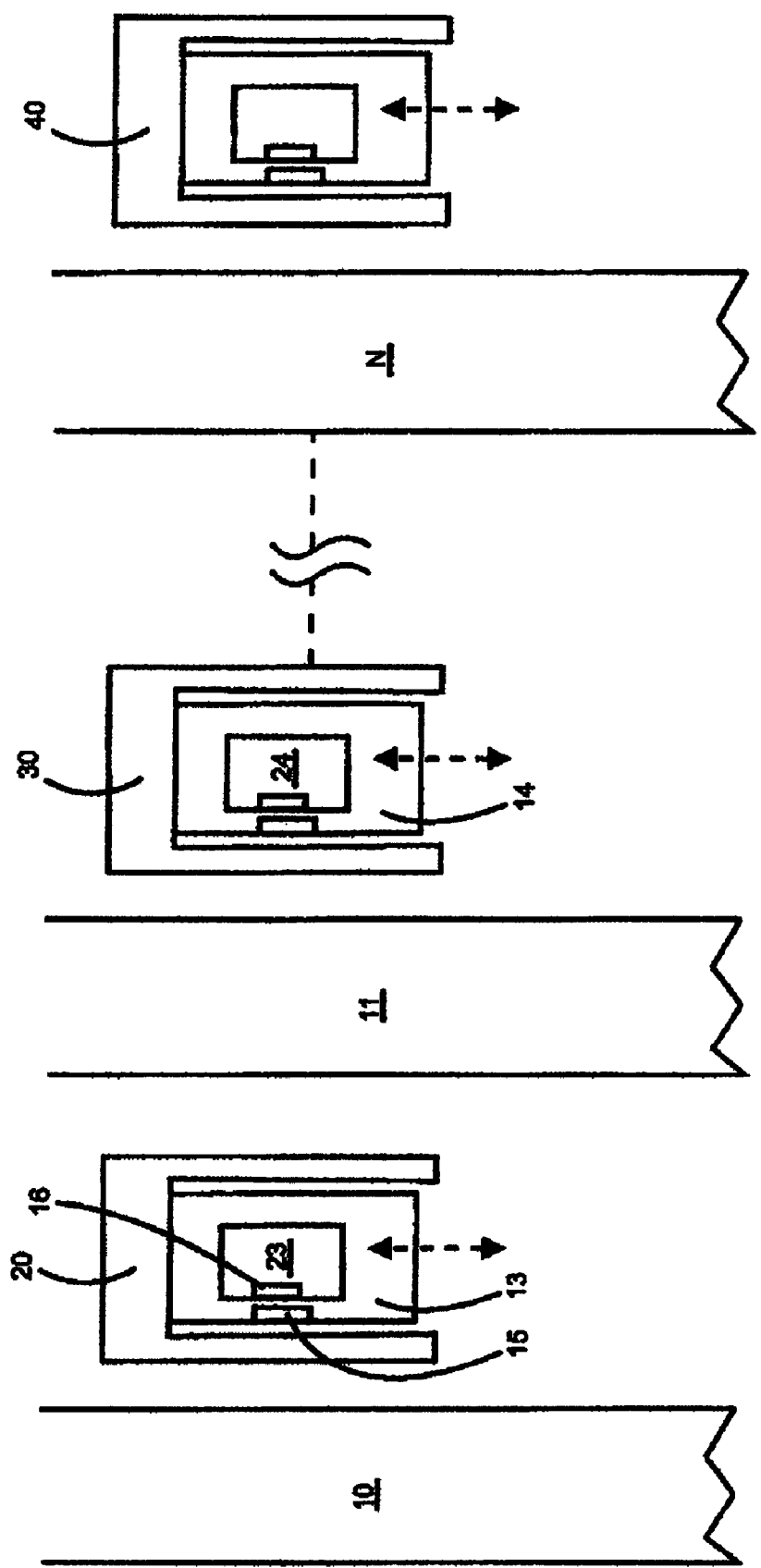
FIG. 1 is a generalized diagrammatic plan view of a line of retail store POS "check-out" terminals illustrative of an embodiment of the present invention.
Figure 2:
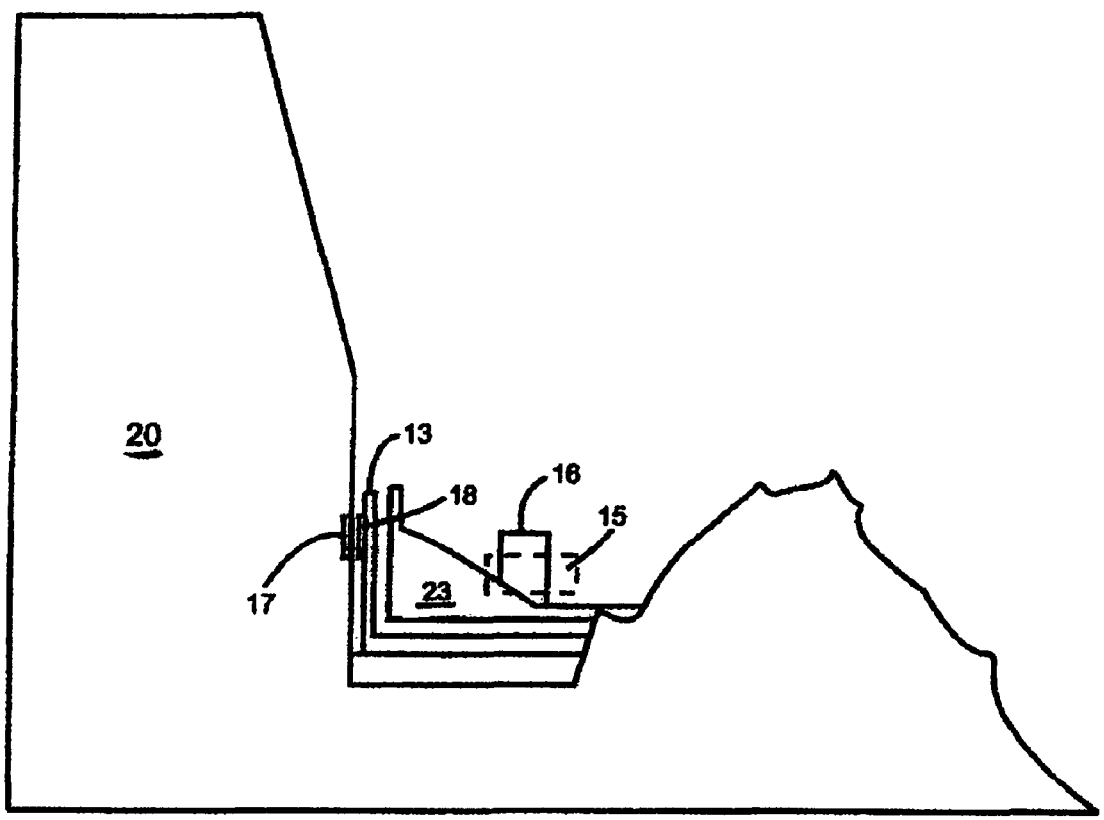
FIG. 2 is an illustrative diagrammatic fragmentary side view of one of the POS terminals of FIG. 1.
Figure 3:
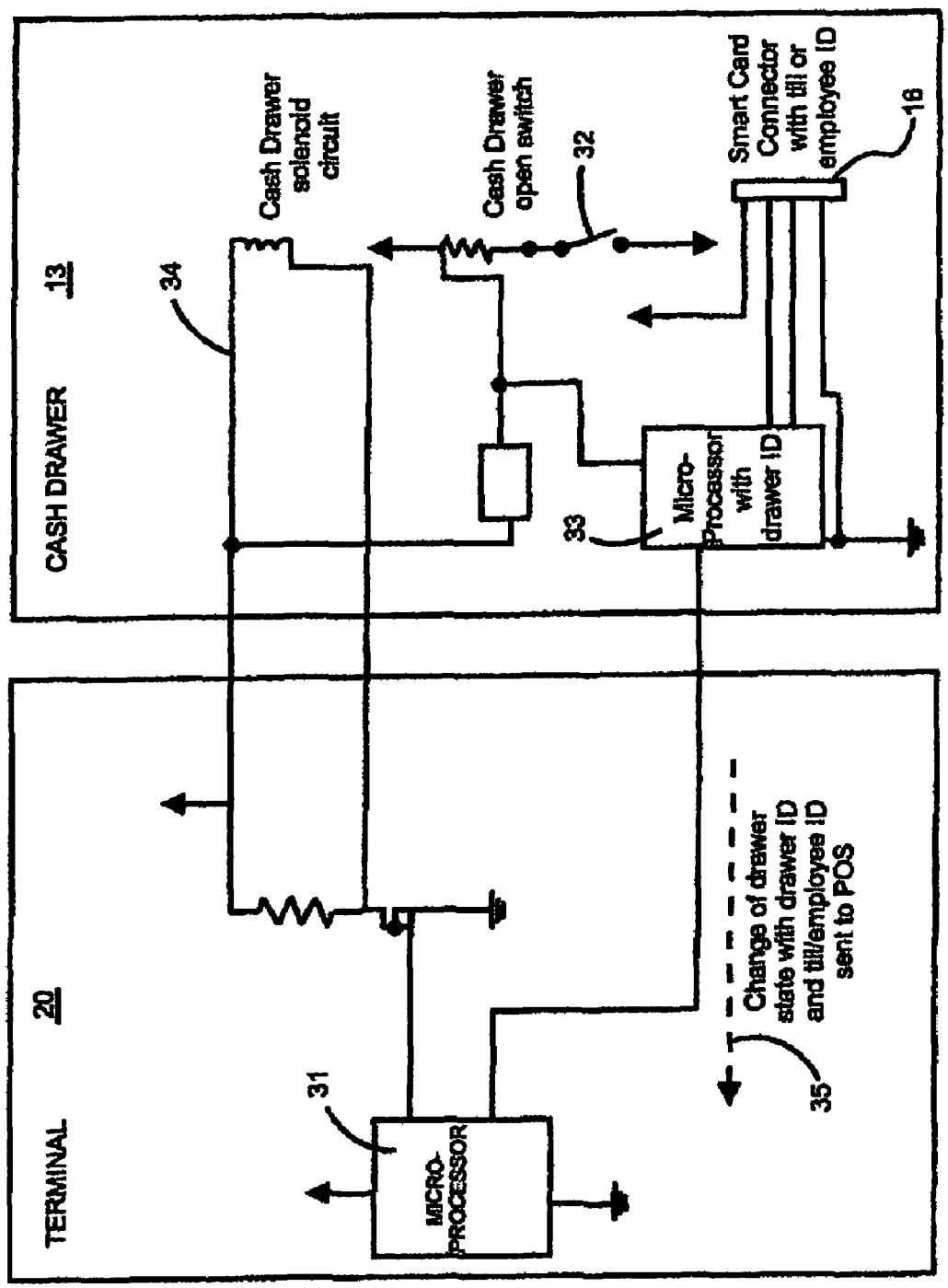
FIG. 3 is a circuit diagram of the illustrative circuitry between the cash drawer and the POS terminal is an embodiment of the present invention.

Referring to FIG. 1, a row of POS terminals, e.g. checkout terminals, at a retail business establishment are shown. Each terminal checkout aisle 10, 11 and N has an associated POS terminal 20, 30 and 40. Each terminal includes a respective cash drawer 13 and 14 together with a respective removable till 23 and 24. With reference to an illustrative terminal 20, as shown in FIG. 1, and in a fragmentary section in FIG. 2, the terminal 20 is assigned a fixed ID and cash drawer 13, associated with terminal 20, is also assigned a fixed ID. The variable or changeable data associated with terminal 20 is provided by removable cash till 23. The till can be switched from cash drawer to cash drawer. For example, till 23 may be removed from cash drawer 13 and put into cash drawer 14 associated with terminal 30 or into the cash drawer associated with terminal 40. The particular removable till currently in a cash drawer may be sensed or read by a device in the cash drawer when the till is set in the drawer. For example, reader 15 in cash drawer 13 reads indicator 16 in till 23 in FIGS. 1 and 2. Each cash till may be permanently assigned to an operator, in which case the assignment is initially transmitted to the POS administrator, and when the insertion of the till in a particular cash drawer is read, the assigned operator is associated with those cash drawer transactions. Where there is no permanent assignment of the till, an operator identifier must be associated with each operator assignment for cash till. As will hereinafter be described in greater detail, this may be accomplished through the use of a smartcard assigned to the operator that may be mounted in the cash till to serve as the identifier. Any set of devices conveniently implemented by POS technology may be utilized for cash till identifier reading. In a simple or rudimentary apparatus, identifier 16 may be a barcode, and reader 15 may be a barcode reader. The identifier 16 may also have only a simple magnetic memory strip with just user ID data, in which case reader 15 would be a strip reader. Identifier 16 may have optical data storage, in which case reader 15 would be an optical reader. The card may also be a smartcard, i.e. it contains integrated circuitry with a limited amount of intelligence through logic and some memory. The smartcard and related smart media is described in detail at pp. 388-389 of the text, *Winn L Bosch Hardware Bible*, 5th Edition, 1999, Que Division of MacMillan Publishing, Indianapolis, Ind. Where the smartcard is assigned to an operator and cash tills are not permanently assigned, the till may have a holder into which the operator's smartcard functioning as identifier 16 would be inserted into the holder (not shown). Such a set up could be adapted to permanently mount the operator's smartcard in the holder when the cash till is permanently assigned to an operator. As shown in FIG. 2, the cash drawer 13 may contain portion 18 of the open/close switch wherein portion 18 disengages/engages switch portion 17 on the housing of POS terminal 20. Thus, when the cash drawer is in the closed state, switch portions 17 and 18 are engaged and switch 32 in the cash draw/terminal circuit, FIG. 3, is in the closed state.

Now, with reference to FIG. 3, the circuitry involved in an embodiment of the present invention will be described. The circuitry associated with the cash drawer 13 is defined by one peripheral line box and the circuitry associated with the POS terminal 20 is defined by the other peripheral line box. The cash drawer open/close status is determined by cash drawer (open) switch 32 in association with cash drawer solenoid circuit 34. In conventional POS technology, upon the opening of cash drawer 13, switch 32 opens as shown and a signal is sent to cash drawer microprocessor 31 indicating that the cash drawer has been opened. In conventional POS terminal technology, the open status of the cash drawer 13 will be communicated to the POS system administrator over a status line 35 under the control of POS microprocessor 31.

In accordance with the present invention, there is incorporated into the cash drawer circuit, a microprocessor 33, preferably in the form of a microprocessor chip that stores transitory data, i.e. data indicative of changes associated with the cash drawer 13, and hence the particular terminal 20 since the terminal 20 has been assigned a fixed identifier. In the present embodiment, for purposes of illustration, the cash drawer has an identifier that is already stored in association with cash drawer microprocessor 33. Also, the data read from the removable cash till identifier 16 is stored so as to be read into cash drawer microprocessor 33. As previously described, the till identifier may also be the user or operator identifier and be a smartcard associated with the employee/operator. Where an employee/operator is involved, other transitory data obtained from the operator's smartcard could affect the security level of the operator with respect to the terminal or the POS system, or what decisions the operator is authorized to make with respect to the terminal. Accordingly, when there is a change in the employee, as indicated by a new smartcard, there may be different functions permitted or denied at the terminal appropriate for the operator.

Also, different data indicative of changes associated with terminal 20 and cash drawer 13 may be stored in cash drawer microprocessor 33.

Accordingly, upon the opening of cash drawer switch 32, when the change in open/close status of the cash drawer would ordinarily be transmitted to the POS administrator over status line 35, all of the above described data stored in association with cash drawer microprocessor 33 would also be transmitted over status line 35 to the POS administrator under the control of the terminal microprocessor 31.

Although certain preferred embodiments have been shown and described, it will be understood that many changes and modifications may be made therein without departing from the scope and intent of the appended claims.

What is claimed is:

1. A point of sale network system including a plurality of point sale terminals connected to a system administrator, each of said terminals comprising:
   a cash drawer including a drawer identifier;
   a microprocessor incorporated into said cash drawer;
   data indicative of changes related to each terminal stored in association with said microprocessor;
   a device in each drawer, responsive to a switch in the open/close status of the drawer for transmitting the switch in status of said drawer to said system administrator via a status line; and
   an implementation in said microprocessor, responsive to said switch in status, for transmitting said data indicative of changes to said system administrator via said status line.

2. The point of sale system of claim 1 wherein said switch indicates the opening of said drawer.

3. The point of sale system of claim 2 wherein said data indicative of changes is an identifier indicating a new till has been inserted into the drawer.

4. The point of sale system of claim 2 wherein said data indicative of changes is an identifier indicating chat the till of a new user has been inserted into the drawer.

5. The point of sale system of claim 3 wherein the stored data is a readable identifier on said new till.

6. The point of sale system of claim 4 wherein the stored data is a readable user identifier element inserted into the till.

7. The point of sale system of claim 2 wherein:
   said plurality of terminals are a set of checkout lane terminals at a retail business;
   said system administrator is a controller for correlating said transaction data received from said terminal with said drawer and said till identifiers;
   each of said cash drawers has a fixed association with a corresponding terminal; and
   each of said tills may be switched from cash drawer to cash drawer.

8. A method for transmitting data in a point of sale network system including a plurality of point sale terminals connected to a system administrator comprising:
   storing a drawer identifier in association with a cash drawer in each terminal;
   storing data indicative of changes related to each terminal stored in association with said cash drawer;
   transmitting a switch in the open/close status of each drawer to said system administrator via a status line in response to said switch in status; and
   also transmitting said stored data indicative of changes to said system administrator via said status line in response to said switch in status.

9. The method of claim 8 wherein said switch in status indicates the opening of said drawer.

10. The method of claim 9 wherein said data indicative of changes is an identifier indicating a new till has been inserted into the drawer.

11. The method of claim 9 wherein said data indicative of changes is an identifier indicating a new user associated with said drawer.

12. The method of claim 1 wherein:

said plurality of terminals are a set of checkout lane terminals at a retail business;

said system administrator is a controller for correlating said transaction data received from said terminal with said drawer and said till identifiers;

each of said cash drawers has a fixed association with a corresponding terminal; and each of said tills is enabled to be switched from cash drawer to cash drawer.

13. A point of sale network system including a set of checkout line terminals at a retail business connected to a controller for correlating said transaction data received from said terminals, each of said terminals comprising:

a cash drawer having a fixed association with said terminal, and including a drawer identifier;

a cash till, including a till identifier of till user removably switchable between cash drawers;

apparatus for reading said drawer identifier;

apparatus for reading said till identifier during the engagement of said till with said drawer including:
  an element for reading said till identifier of said user; and
  a structure in said till adapted to receive said user identifier element in a position such that the user identifier is read by said apparatus for reading said till identifier during the engagement of said till with drawer;

apparatus for transmitting said read drawer and till identifiers to said controller;

a device for sensing the disengagement of said till; and apparatus for signalling said controller that said till is disengaged from said drawer.

14. The point of sale system of claim 13 wherein said element for reading said till identifier is removably received in said till structure.

* * * * *